2,978,440

ANTI-STATIC VINYL CHLORIDE COPOLYMER CONTAINING SALTS OF DIALKYL PHOSPHATES

Warren J. Frissell, Jr., Martinsville, and Vladimir J. Houska, Bound Brook, N.J., assignors to Union Carbide Corporation, a corporation of New York No Drawing. Filed Nov. 29, 1955, Ser. No. 549,866

2 Claims. (Cl. 260—87.1)

This invention relates to vinyl resin compositions having a substantially reduced tendency to acquire and retain a static charge. More particularly it concerns compositions comprising vinyl resins in admixture with an anionic surface active agent compatible therewith, which compositions are substantially non-susceptible to the accumulation of a static charge.

Articles made from polymers and copolymers of vinyl chloride, and plasticized and filled compositions of such resins, have a tendency to acquire and retain an electrostatic charge. Such electrostatically charged articles are not only difficult to manipulate but also attract and retain dust and dirt particles on their surfaces. Films and sheets are known to cling together and are separated with difficulty, especially on modern high speed automatic equipment. The accumulation of an electrostatic charge is particularly undesirable in vinyl polymer flooring material which may constitute a spark hazard in such locations as hospital operating rooms, laboratories or other areas liable to contain low flash point vapors. Fabrics woven from fibers containing polyvinyl resins do not drape properly or have the desired feel, and garments manufactured from such woven cloth cling to the body or flair unduly because of such static charges. The static charges acquired by vinyl sheeting upholstery or vinyl blankets and other articles frequently impart a disturbing electric shock to the user. Molded articles also are affected because of the tendency of the electrostatically charged surfaces to attract dirt. This is particularly undesirable when the resin is used for molding sound records. Dust and grit attracted by the electrostatic charge produce an abrasive action on the grooves causing undue wear, distorted sound reproduction and increased noise level.

Heretofore anti-static properties have been obtained on polyvinyl resins by surface coating the formed article. Such treatment has been only partially effective. It is undesirable since it is usually transient and for example the coating is generally removable by washing or rubbing. Moreover, the coating method involves the use of an extra process operation and consequently decreases productivity. The surface coating is usually applied by dipping or wetting the article with an aqueous or solvent solution or suspension of the selected anti-static agent and then driving off the vehicle and leaving a residue of the anti-static agent on the surface of the finished article. In many instances such treatment impairs certain desirable surface characteristics such as chemical resistance, hardness, resilience, appearance and the like. Generally, the anti-static agents effective in surface treating processes can not be incorporated directly into the vinyl resin because of their incompatibility therewith; and inclusion of an amount sufficient to provide anti-static behavior results in an unacceptable degree of sweat-out or blush or bloom.

It has now been found that certain anionic surface active agents can be blended with or uniformly dispersed in polyvinyl resins to yield compatible compositions having little tendency to acquire or retain an electrostatic charge and which show no signs of sweat-out at concentrations sufficient to impart anti-static behavior.

The anti-static agents effective in this invention are certain surface active agents which are compatible with vinyl resin compositions to the extent that they do not bloom or sweat out excessively when used in amounts up to about 15% by weight of the vinyl resin.

Surface active agents are generally classified as anionic, cationic and nonionic and surprisingly it has been found that of these three classes only the anionic surface active agents have the requisite compatibility in polyvinyl resins to be effective permanent anti-static agents without concomitant "sweat out" or "bloom."

Typical of the anionic surface active agents which have been found useful in this invention are the alkali metal salts of the dialkyl phosphates, of the alkyl sulfonates, of the alkyl arylene sulfonates, and of the aryl sulfonates.

In general the preferred alkali metal salts of the alkyl phosphates and alkyl sulfonates are those prepared from a mixture of fatty alcohols in the 4 to 14 carbon range while the alkali metal salts of the alkyl arylene sulfonates are those of the lower alkyl substituted benzene or naphthalene sulfonates. In such compounds the hydrophobic group, i.e. the paraffin chain or aromatic group to which a paraffin chain is attached is relatively large compared to the hydrophilic group, i.e. $O-PO_3Na$, $-O-SO_3Na$ or $-SO_3Na$. Such compounds are compatible with polyvinyl resins up to about 15% by weight and when used in amounts of about 3 to 10 parts per 100 parts of resin are effective permanent anti-static agents which do not "bloom" or "blush out" on the surface of the polyvinyl composition. Contrariwise cationic and non-ionic surface active agents such as octadecyl amine and polyethylene glycol ("Carbowax") "bloom" and "blush out" when used in amounts sufficient to give anti-static properties to polyvinyl resins and thereby impair the surface gloss and appearance of the polyvinyl composition.

Particularly effective as anti-static agents are sodium dioctyl phosphate, sodium dilauryl phosphate, sodium lauryl sulfonate, sodium isopropyl naphthalene sulfonate, sodium dibutyl naphthalene sulfonate, sodium decyl benzene sulfonate, sodium dodecyl benzene sulfonate and the like.

The concentration of anti-static agent added to the vinyl chloride-containing resin may be varied from about 0.25 to about 15 parts by weight, but preferably from about 3 to about 10 parts anti-static agent per 100 parts by weight of resin are used. Larger quantities may be used if desired but this may lead to sweat-out or other undesirable physical effects, such as poor surface appearance. The anti-static agent can be incorporated into the vinyl chloride-containing resin by any of the well known thermoplastic resin compounding methods such as by mixing on a two-roll mill or in a Banbury mixer. The anti-static agent may be added as such, or it can be masterbatched in one of the components of the mix as for example in the plasticizer, or it can be added as a solution or suspension in a liquid which is a solvent for the polymer if desirable, as might be the case when preparing a blend for spinning of fibers.

Polyvinyl resins which can be effectively treated to reduce or eliminate static charge by this invention include the polyvinyl chloride polymers, and the copolymers of vinyl chloride with other ethylenically unsaturated compounds provided that said copolymers contain at least about 10% by weight of vinyl chloride. Suitable comonomers for reaction with the vinyl chloride are exemplified by the vinyl esters such as vinyl acetate, vinyl butyrate, vinyl benzoate and the like; the vinyl ethers such as vinyl ethyl ether, vinyl chloroethyl ether, vinyl phenyl ether and the like; the vinyl ketones such as vinyl methyl ketone, vinyl phenyl ketone and the like; the vinylidene halides such as vinylidene chloride, 1-fluoro-1-chloroethylene, and the like; the acrylic compounds such as acrylonitrile, chloroacrylonitrile, methyl acrylate, methyl methacrylate, 2-ethylhexyl acrylate and the like; the allylic compounds such as allylidene diacetate, chloroallylidene diacetate, and the like; and other mono-unsaturated compounds.

The anti-static agents of this invention are equally effective in unmodified vinyl chloride-containing resins and in modified resins. The modified resins are those which have had added thereto plasticizers, stabilizers, pigments, dyes, fillers, densifying agents or any such other modifiers as are often employed in combination with vinyl chloride-containing resins.

The effectiveness of the anti-static agent is determined indirectly by measuring the volume resistivity of the anti-static agent-containing resin and directly by means of the "cigarette ash test." Volume resistivity was determined in conformity with the method of ASTM D-257-52T and is considered an indirect method of determining the anti-static behavior of a selected agent for the reason that it is known that a material or composition becomes less prone to acquire and retain an electrostatic charge as its volume resistivity decreases. Therefore, if a sample containing an anti-static agent has a lower volume resistivity value than one without such an agent then it will be less apt to acquire and retain an electrostatic charge. Volume resistivity is therefore a useful first index to the effectiveness of a selected anti-static agent.

The effect of the selected anti-static agent is then directly verified by means of the "cigarette ash test." A specimen of the vinyl chloride-containing resin is rubbed against a wool cloth about 10 to 12 times and it is then held about one inch above a small pile of fresh cigarette ashes. A material which has developed a static charge by the rubbing will cause the ash to leap upwards and adhere to its surface. A visual comparison is then made to compare the effect of an anti-static agent at various concentrations in a vinyl chloride-containing resin with a control specimen containing no anti-static agent. Polyvinyl resin compositions containing the anti-static agents of this invention retained their anti-static properties upon room temperature storage and even after severe scrubbing of the anti-static agent-containing composition in warm soapy water.

In summary our invention relates to the incorporation of from about 0.25 to about 15 parts by weight of an anionic surface active agent such as an alkali metal salt of a dialkyl phosphate, or of an alkyl sulfonate, or of an alkyl arylene sulfonate in a vinyl chloride-containing resin which consists of at least about 10% by weight of vinyl chloride to yield compositions having little tendency to acquire and retain an electrostatic charge.

The following examples further serve to illustrate the invention. Parts are by weight unless otherwise specified.

EXAMPLE 1

A mixture consisting of 100 parts of a 95:5 vinyl chloride:vinyl acetate copolymer, 50 parts of dioctyl phthalate, 2 parts of dibasic lead phosphite, 1 part of dibasic lead stearate and 5 parts of sodium dioctyl phosphate as anti-static agent was blended together for 5 minutes at about 25° C. The blended material was fluxed on a two roll mill at 170° C. for 10 minutes and rolled to a sheet about 40 mils thick. The volume resistivity of the composition was measured on a disc molded from this sheet in conformity with the method described in ASTM D-257-52T and a value of $1.7 \times 10^4$ megohm-cm. at 50° C. was obtained. An approximately 3 x 4 inch section of the 40 mil sheet was used for the cigarette ash test. No cigarette ash pickup was observed either on the freshly prepared material or on the material after aging for 2 months at about 25° C. even after scrubbing in soapy water.

For comparison purposes an identical blend was prepared in which the anti-static agent was omitted. The volume resistivity at 50° C. was $4.3 \times 10^5$ megohm-cm. The cigarette ash test showed appreciable ash pickup with both the fresh and aged materials.

Examples 2 to 5 summarized in Table I were compounded and tested in the same manner as described in Example 1 using different quantities of sodium dioctyl phosphate and other anti-static agents.

*Table I*

| Ex. | Anti-Static Agent | Volume Resistivity, megohm-cm. at 50° C. | Cigarette Ash Pickup | |
|---|---|---|---|---|
| | | | Fresh Material | Aged 2 Mo. at 25° C. |
| 2 | 1 pt. sodium dioctyl phosphate. | $7.1 \times 10^4$ | No | Slight. |
| 3 | 10 pts. sodium dioctyl phosphate. | $9.9 \times 10^3$ | No | No. |
| 4 | 5 pts. sodium lauryl sulfonate | $1.4 \times 10^4$ | No | No. |
| 5 | 5 pts. sodium isopropyl naphthalene sulfonate. | $1.8 \times 10^4$ | No | No. |

EXAMPLE 6

A blend consisting of 100 parts of a 95:5 vinyl chloride : vinyl acetate copolymer, 1 part of dibasic lead stearate, 2 parts of dibasic lead phosphite, 60 parts of tricresyl phosphate and 5 parts of sodium dioctyl phosphate as anti-static agent was compounded and tested as described in Example 1. The volume resistivity at 50° C. was $3.4 \times 10^3$ megohm-cm. No cigarette ash pick-up was observed on either the freshly made material or after it had been stored for 2 months at room temperature.

EXAMPLE 7

A blend consisting of 100 parts of a 95:5 vinyl chloride : vinyl acetate copolymer, 1 part of dibasic lead stearate, 2 parts of dibasic lead phosphite, 50 parts of dioctyl phthalate, 50 parts of Atomite (ground calcium carbonate) and 5 parts of sodium dioctyl phosphate as anti-static agent was compounded and tested as described in Example 1. The volume resistivity at 50° C. was $8.5 \times 10^3$ megohm-cm. No cigarette ash pick-up was observed either immediately or after storage for 2 months at room temperature.

EXAMPLE 8

A blend consisting of 97.5 parts of an 85:15 vinyl chloride:vinyl acetate copolymer, 1.5 parts of dibasic lead stearate, 1 part of carbon black and 4.9 parts of sodium dioctyl phosphate as anti-static agent was prepared by pre-blending at about 25° C. in a ribbon blender. The mixture was then fluxed and mixed about 5 minutes in a Banbury mixer to a discharge temperature of about 150° C., sheeted on and passed four times through a two-roll mill at 135° C. to yield a sheet about 125 mils thick. The roll sheet was used to compression to mold sound records 10 inches in diameter by about 0.08 inch thick. One week after molding, the records were tested for static by rubbing them with a wool cloth and holding them near freshly deposited cigarette ashes. No ash pick-up was observed.

For comparison purposes similar blends were prepared containing no anti-static agent and 2.92 parts of sodium dioctyl phosphate as anti-static agent. The sound records prepared from the blend containing no anti-static agent showed considerable ash pick-up, while the sound records prepared from the blend containing 2.92 parts of anti-static agent showed an ash pick-up of only a few isolated wisps of ash when tested by the above described procedure.

Use of cationic surface active agents, such as octadecyl amine, or non-ionic surface active agents, such as polyethylene glycol (M.W. ca. 1500), in polyvinyl resins yield compositions having reduced tendencies to acquire a static charge. However, such surface active agents showed an undesirable blooming effect and also a poor compatability with the resin. These agents also caused excessive color formation in hot-milled blends with a brown color resulting, whereas the anionic surface active agents gave blends which ranged in color from white to ivory to light grey.

What is claimed is:

1. A homogeneous composition of matter characterized by little tendency to acquire and retain a static charge, said composition comprising a copolymer of vinyl chloride and vinyl acetate, in which at least about 10% by weight of said copolymer consists of vinyl chloride, in admixture with from about 0.25 to about 15 parts by weight, per 100 parts by weight of said copolymer, of an alkali metal salt of a dialkyl phosphate wherein each of the alkyl groups contains from 4 to about 12 carbon atoms.

2. A homogeneous composition of matter as claimed in claim 1 wherein the alkali metal salt of a dialkyl phosphate is sodium dioctyl phosphate.

References Cited in the file of this patent

UNITED STATES PATENTS

| | | |
|---|---|---|
| 2,381,020 | Wilkes et al. | Aug. 7, 1945 |
| 2,393,863 | Myers | Jan. 29, 1946 |
| 2,498,408 | Fox | Feb. 21, 1950 |
| 2,514,191 | Rowland et al. | July 4, 1950 |
| 2,674,593 | Condo et al. | Apr. 6, 1954 |
| 2,723,246 | Boyd et al. | Nov. 8, 1955 |

FOREIGN PATENTS

| | | |
|---|---|---|
| 700,356 | Great Britain | Dec. 2, 1953 |

OTHER REFERENCES

Schwartz: "Surface Active Agents," Interscience Publ., N.Y. (1949), pages 15 and 16.